March 7, 1967     J. RABINOW     3,307,899
LIGHT SENSITIVE ADJUSTABLE REAR VIEW MIRROR
Filed Oct. 29, 1963     2 Sheets-Sheet 1
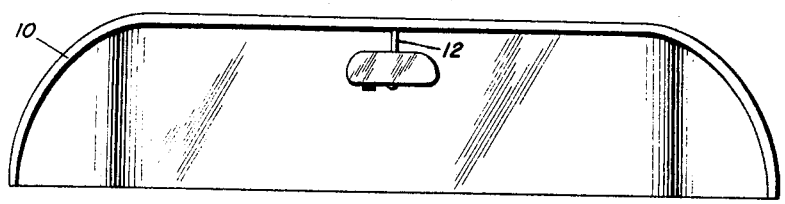
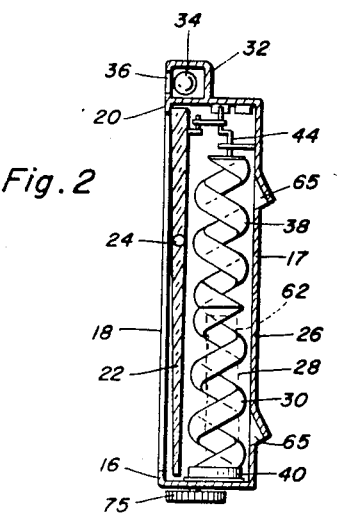
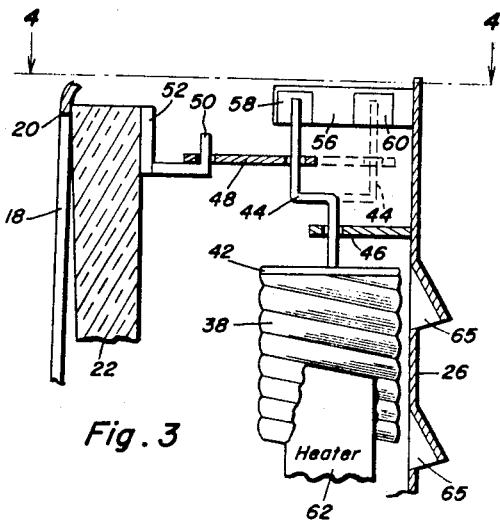
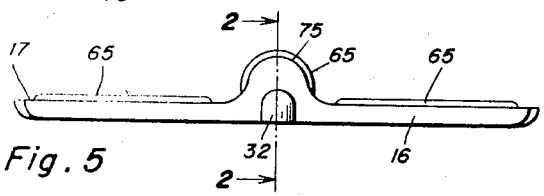
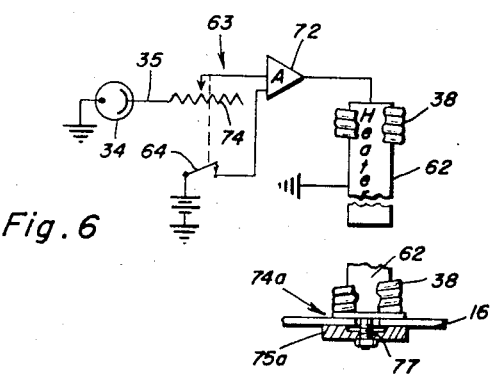
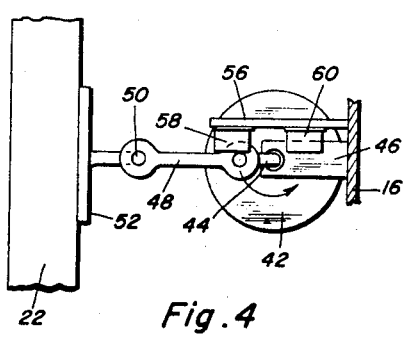
INVENTOR
Jacob Rabinow
BY Joseph A. Genovese &
Max L. Libman
ATTORNEYS March 7, 1967   J. RABINOW   3,307,899
LIGHT SENSITIVE ADJUSTABLE REAR VIEW MIRROR
Filed Oct. 29, 1963   2 Sheets-Sheet 2
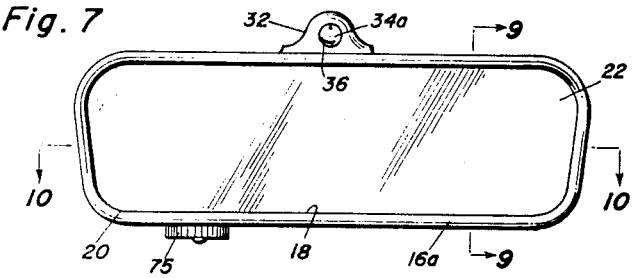
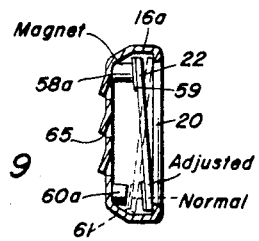
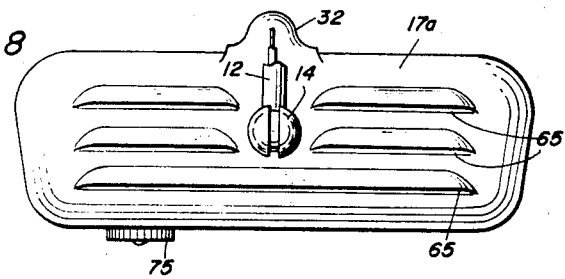
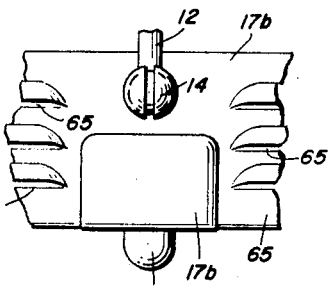
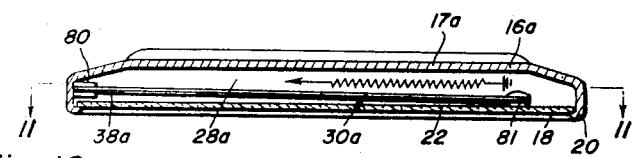
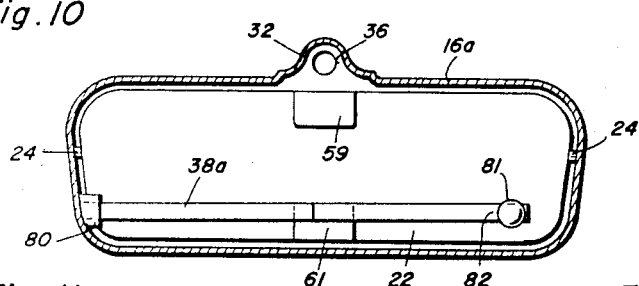
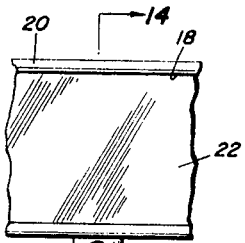
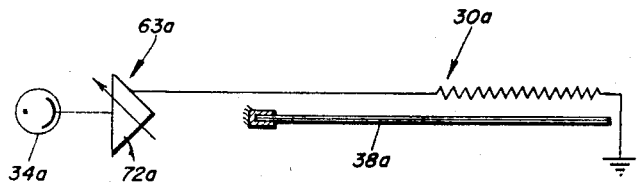
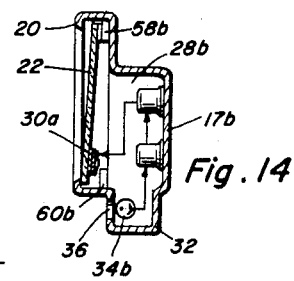
INVENTOR
Jacob Rabinow
BY Joseph A. Genovese &
Max L. Libman
ATTORNEYS

United States Patent Office 3,307,899
Patented Mar. 7, 1967

3,307,899
LIGHT SENSITIVE ADJUSTABLE REAR VIEW MIRROR
Jacob Rabinow, 6920 Selkirk Drive, Bethesda, Md. 20034
Filed Oct. 29, 1963, Ser. No. 319,862
5 Claims. (Cl. 350—281)

This invention relates to rear view mirrors for motor vehicles, and particularly to photoelectrically controlled, adjustable mirrors.

Photoelectrically controlled rear view mirrors are known. For instance, the Rabinow et al. U.S. Patent No. 3,000,262 discloses several mirrors which automatically adjust when a photosensitive element experiences light that is sufficiently bright to annoy the motor vehicle operator when reflected from the mirror.

Prior automatically adjusted mirrors suffer from certain difficulties which are overcome by my invention. For example, earlier mirrors use a solenoid or a relay (or the equivalent) under the control of the output of a photocell, to provide the operating force to adjust the reflective panel of the mirror. Apart from the space requirement and characteristic noise in solenoid and relay operation, relays and solenoids are ordinarily "on" or "off" devices, and any uncertainty between the two states can result in additional noise, as chattering, singing, etc. In addition, relays which can be acquired at a cost considered reasonable for automotive use and which will provide the necessary force, are somewhat large and heavy to be mounted on or in the casing of the rear view mirror. Finally, unless some circuit provision is made (with its accompanying cost), ordinary relay circuits to adjust a rear view mirror operate too rapidly. Once sufficiently energized, the armature of the solenoid or relay responds suddenly. This not only provides relay actuation noise but can also shock or jar the entire mirror assembly.

An object of my invention is to provide an actuator for an adjustable rear view mirror, which not only overcomes the above difficulties but also, does so at a saving in manufacturing cost.

A typical embodiment of my mirror uses a conventional mirror panel which forms a bright and a weak image. In manual devices the motor vehicle selects one of the images by tilting the mirror panel to one of two positions. As in my prior patent, I use a photocell circuit which responds to bright light to provide an electrical signal when the light falling on the photocell is too bright for the comfort (and safety) of the motorist. Instead of using the electrical signal to operate a relay or the like, I use the signal to operate a thermal actuator which, in turn, tilts the mirror panel from one stable position (called "normal") to a second stable position (called "adjusted"). I use the same thermal actuator to return the mirror panel when the photocell no longer experiences bright light.

There are advantages in using a thermal actuator, which are not obvious. A thermal actuator (typically made of a compensated bimetal strip of selected configurations together with a heater) is inherently "slow" in responding when subjected to heat. It is "slow" in comparison to a relay or solenoid, and this is advantageous because the mirror should not respond to instantaneous peak intensities of light as are often experienced in heavy traffic. In other words, the mirror panel should not oscillate back and forth with each light that quickly flashes across the mirror, as in city traffic. Although photocell-amplifier-relay circuits possibly can be made to be slow-responsive in the above manner, to do so generally requires an additional expense in circuit construction. My objective is to provide an economical adjustable mirror; and furthermore, photocell-relay circuits generally do not have a summarizing effect corresponding to my thermal actuator (explained below).

In prior adjustable mirrors of which I am aware the relay operates immediately upon the photocell experiencing a bright light. If, as I suggest above, the photocell amplifier circuit is designed to ignore short term bright lights—which to my knowledge is not in the prior art—the succession of "ignored" bright lights will have no effect on one another as handled by the mirror circuit. However, my thermal actuator will inherently ignore bright flashes of lights because the thermal actuator may require one-half to one or two seconds for the heater to sufficiently heat the bimetal strip to actuate the mirror panel. But, each time that a bright flash of light is "ignored" by the mirror panel, it is only because the bimetal strip was not sufficiently heated to produce the force necessary to actuate the mirror panel. If the flashes of bright light are very frequent (which may be more of an annoyance than steady bright light) the heater will finally warm the bimetal element to its mirror-panel triggering point. In this sense, my actuator has the effect of summing frequent flashes of light to adjust the mirror panel under such an objectionable traffic condition. An analogous advantage is realized in tilting the mirror from the "adjusted" to the "normal" position. My mirror does not immediately return when the photocell no longer experiences bright light. Instead, there is a brief cooling period required before the thermal actuator returns the mirror panel.

In the above several ways my invention exploits the "slow" response (e.g. of the order of one half to three seconds) of my thermal actuator. But, at the same time slow transition of the reflective panel from one stable position to the other cannot be tolerated. Once the mirror begins to move (adjust), the motion of the panel must be crisp and prompt. Again, I take advantage of another feature of a bimetal element. When being heated (or cooled) the force capable of being exerted by the element corresponds to the applied (or withdrawn) heat. Thus, I have means, e.g. weak magnets, to (a) establish the two stable positions of the mirror panel, and (b) oppose the element-applied force tending to adjust the panel, until the force becomes large enough to crisply move the panel between the two stable positions.

Another object of my invention is to provide an adjustable mirror constructed to operate in the above manner.

Other objects and features will become evident in following the description of the illustrated forms of my invention which are given by way of example only.

FIGURE 1 is an elevational view showing my adjustable mirror mounted in a motor vehicle.

FIGURE 2 is a vertical sectional view of the mirror taken on the line 2—2 of FIGURE 5.

FIGURE 3 is an enlarged fragmentary schematic view showing a part of the bimetal actuator strip and of the drive connection between the actuator and mirror panel.

FIGURE 4 is a sectional view taken on the line 4—4 of FIGURE 3.

FIGURE 5 is a top view of the mirror.

FIGURE 6 is a wiring diagram.

FIGURE 6a is a fragmentary view showing a mechanical variation of the sensitivity control for my mirror.

FIGURE 7 is a front view of another embodiment of the adjustable mirror.

FIGURE 8 is a back view of the mirror of FIGURE 7.

FIGURE 9 is a sectional view taken on the line 9—9 of FIGURE 7.

FIGURE 10 is a sectional view taken on line 10—10 of FIGURE 7.

FIGURE 11 is a sectional view taken on line 11—11 of FIGURE 10.

FIGURE 12 is a fragmentary rear view of another modification.

FIGURE 13 is a fragmentary front view of the modification in FIGURE 12.

FIGURE 14 is a sectional view taken on line 14—14 of FIGURE 13.

FIGURE 15 is a schematic wiring diagram.

Preface

Each embodiment of my mirror is suitably mounted as in motor vehicle 10 (FIGURE 1) by a bracket 12 having an articulate coupling 14 (FIGURES 8 and 12).

Structurally, each of my mirrors has a metal casing 16, 16a or 16b provided with a front opening 18 having lip 20 at its edge. Reflective member or panel 22 is movably mounted behind lip 20, e.g. by trunnions 24 located on a horizontal axis approximately coincident with the center of gravity of the panel. The reflective panel is identical to those used in conventional adjustable mirrors for motor vehicles. As known, when in one position there is almost total light reflection to the eyes of the motorist, and when tilted to a second stable position the light reaching the eyes of the motorist is considerably attenuated, owing to the use of a different reflection within the mirror panel.

One of the main features of my mirror is found in a thermal actuator used for moving the mirror panel 22 between the two stable positions. When bright light falls upon a light sensing element, my actuator moves panel 22 from its first stable position (also called the "normal" position) to its second (or "adjusted") position. When the light "seen" by the photosensitive element of my mirror is not so bright (or substantially none is "seen") my actuator returns panel 22 from the "adjusted" to its "normal" position. The above operation applies to all forms of my mirror.

FIGURES 2–6

The back wall 17 of mirror casing 16 has a recessed part 26 which defines a component compartment 28 to accommodate actuator 30. A small housing 32 at the upper (or lower or side) edge of casing 16 contains photocell 34 (described later) which is aligned with window 36 in the front of housing 32.

Actuator 30 consists of a thermally responsive, compensated, bimetal element 38, e.g. a strip of the form of a spiral or helix, to provide a long element in the necessarily small volume of compartment 28. One end of element 38 is fixed to a casing 16, e.g. by a clamp 40, rivet, or the equivalent. The other end of element 38 has torison plate 42 fixed to the adjacent turn of the element (FIGURES 3 and 4) to which crank 44 is fixed. The crank extends through an aperture in one end of pitman 48. The other end of the pitman is engaged with a mirror-panel drive pin 50 suitably fixed to panel 22, as by being made part of a bracket 52 cemented or otherwise fixed to panel 22 near one of its longitudinal edges. Accordingly, when the compensated bimetal strip distends and retracts, the crank 44 will rotate between the positions shown in full lines and shown in dotted lines respectively in FIGURE 3. This motion of the crank causes panel 22 to move between "normal" and "adjusted" (FIGURE 9) positions, by the pushing and pulling force applied from the crank to panel 22 by pitman 48.

I have a bracket 56 attached to a wall of casing 16 and located in the path of travel of the upper end of crank 44. The bracket alone can be used as a stop (bracket not shown in this manner) to establish two stable positions for crank 44 at which the axis of the pin 50 and the throw of the crank 44 are coplanar. By this arrangement the "adjusted" and "normal" positions of panel 22 are stable since any force (such as vehicle vibrations and bounces) applied to the panel will not rotate the crank because it is over-center (top or bottom dead center) with respect to the direction of any possible force applied thereto by pitman 48.

FIGURES 3 and 4 show pads 58 and 60 fixed to bracket 56, and these form stops for crank 44. Although optional, stops 58 and 60 are preferred because they can be made of nylon, hard rubber, etc. to arrest shock and noise. A special advantage is obtained by having the stops magnetic e.g. weak steel or ceramic magnets. When stops 58 and 60 are magnetic they retain the upper end of the crank (and thus the panel 22) in one of the two stable positions until a torque, sufficient to break-away the crank from one of the magnets, is experienced by the crank. Then, as the crank approaches the other of the two magnets the magnetic attraction of the approached magnet helps the crank rotate to the second of the two stable positions. In this way the magnets not only aid in retaining panel 22 in its respective "normal" and "adjusted" positions, but they also require the crank (and its connected panel 22) to move crisply between the positions with an action like that of a toggle. As described later, this is particularly advantageous with my thermal actuator because I take advantage of the inherently slow response of a bimetal thermal actuator, but do not want uncertain positions nor slow motion between "normal" and "adjusted". In other word, when the panel begins to move, I want it to move crisply from one position to the other.

In addition to the compensated, bimetal element 38, actuator 30 includes heater 62 adjacent to (e.g. concentric with) one of the usual connected sections of a compensated bimetal element. The heater (FIGURE 6) is controlled by a light-responsive circuit 63 operated by photocell 34 which is suitably selected. The circuit is designed to be compatible with the selected photocell. There are numerous suitable photocells, e.g. photodiodes, cadmium selenide, cadmium sulfide, solar and other small cells. The circuit utilizing the output of the photocell can use transistors or tubes schematically shown as amplifier 72. Although not essential, I prefer to use one (or more) stages of amplification and a transistor (or tube) as a switch to connect a source (output of vehicle battery, generator or alternator) with heater 62. Thus, when the photocell is exposed to bright light the heater 62 will be turned on, and the heater will be turned off when the level of the light falls (or is) below a predetermined value. A sensitivity control 74 (having knob 75 to adjust the above value) is schematically shown as a potentiometer ahead of amplifier 72, although in practice it will usually be located after the first stage (or second when more than one is required) of amplification. If the motor vehicle is equipped with an alternator, A.C. power for circuit 63 is available by connecting to the alternator ahead of its rectifiers.

A modification of the sensitivity control is shown in FIGURE 6a, where control 74a is mechanical. Instead of securing the lower end of element 38 to casing 16, a spindle 77 is attached by a plate or the like to the lower end of element 38, and the spindle extends through an aperture in the bottom of housing 16. A knob 75a having a serrated, toothed, friction or like surface, is attached to spindle 77. The friction surface engages the confronting surface of casing 17 to form a manually adjustable brake which couples element 38 to casing 16. Thus, by turning knob 75a the resilient preload in element 38 can be adjusted to thereby adjust its sensitivity. In both the electrical and mechanical forms of sensitivity adjustments, they can be used to effectively disable the mirror actuator by setting them to a position such that the mirror will not respond to "any" light no matter how bright. Alternatively (or in addition), the mirror circuit can be disabled in the daytime by connecting the circuit (FIGURE 6) to a source under the control of the vehicle headlight circuit. Switch 64 schematically shows such a connection (like the switch-volume control of a radio).

To explain the operation of the embodiment of FIGURES 2–6, assume that panel 22 is in the position shown in FIGURE 3, and that this is the "normal" (heater 62 cool) position. When dim or moderate light falls upon photocell 34, the output signal on line 35 to amplifier 72 is insufficient to switch on the heater 62. When the photocell experiences bright light, heater 62 is switched on (or is energized by the amplifier output, depending on the circuit design). If the bright light is of a short duration as in the case when the light from another vehicle flashes across the photocell (usually in heavy traffic), it will not effect the mirror adjustment for two reasons. The first is that a bimetal element is slow responding to the heat (i.e. "slow" in comparison to the response of a relay or solenoid to an electric current). The second reason is that magnet 58 retains crank 44, and it cannot move until the force exerted on the crank by element 38 is sufficient to break the crank away from magnet 58.

If bright light persists on photocell 34 for an appreciable time, e.g. for one or two seconds, heater 62 will remain energized for that period of time which is long enough for the element 38 to apply a rotational force on crank 44 sufficient to break the crank 44 away from magnet 58. In so moving, crank 44 will promptly swing around to the "adjusted" position as shown in dotted lines in FIGURE 3. Just as this position is approached magnet 60 will attract the upper part of crank 44 and crisply move it against the surface of magnet 60. The movement of the crank causes mirror panel 22 to tilt from its "normal" to its "adjusted" position as explained before.

As long as the photocell detects bright light, heater 62 will remain energized. When the light is no longer bright, heater 62 will be turned off by the described circuit 63 (FIGURE 6) or circuits, and both heater 62 and element 38 will immediately begin to cool. Cooling can be accelerated by the provision of air vents 65 in casing 16, but the rate of cooling presents no serious difficulty as the mirror panel 22 will remain in the "adjusted" position (by magnet 60) as the compensated bimetal elements 38 cools. During cooling, element 38 will tend to return to its original shape, thereby applying torque to crank 44 in a direction to return it to its (and the mirror's) normal position. When the torque is sufficient to break crank 44 away from magnet 60, the crank crisply swings back to magnet 58, thereby tilting the mirror panel to its "normal" position.

FIGURES 7–15

These figures show two additional embodiments of my mirror; however, they are so similar to each other that they are described under the same heading. They distinguish from each other in the disgn of the back walls 17a and 17b of their respective casings 16a and 16b, and in the location of the photocells. FIGURE 1 shows the photocell 34a at the top edge of the mirror, while FIGURE 14 shows the photocell 34b at the bottom edge. FIGURE 14 shows component compartment 28b (with transistors (not numbered) of an amplifier-switching circuit) very similar to the compartment 28 (FIGURE 5); while FIGURE 10 shows the entire casing 16a slightly thickened to provide a full length component compartment 28a.

The major distinction between the mirrors shown in FIGURES 2–6 and in FIGURES 7–15 is in their thermally responsive actuators 30 (FIGURES 2–6) and 30a (FIGURES 7–15). Actuator 30a may be of a single length (shown) or two or more lengths folded back parallel to each other (not shown). In either case, one end of the element 38a is fixed, as by friction-socket clamp 80 to casing 16a (or 16b), and the other end is attached by a slide-connection to the mirror panel 22 to one side of the axis of trunnions 24. The slide-connection can be made by pin 81 fixed to mirror panel 22 and passed through slot 82 (FIGURE 11) in element 38a.

The circuit 63a (FIGURE 15) does not have a separate sensitivity control, but amplifier 72a is shown adjustable for the same purpose. In use, the circuit and magnets 58a and 60a (FIGURE 9) function exactly the same as their counterparts in FIGURES 2–6. The magnets 58a and 60a (58b and 60b in FIGURE 14) are attached to the back wall of casing 16a above and below the tilt axis of the mirror panel and metal wear plates 59 and 61 are fixed to the back of panel 22 to individually contact the magnets when the panel 22 is tilted. The operational difference is that element 38a applies a substantially normal force directly to the mirror panel to respectively push and pull it between "adjusted" and "normal" positions, while element 38 (FIGURE 3) imparts torsional forces to crank 44, and pitman 48 converts it to a normal force applied to the mirror panel.

It is understood that numerous changes may be made without departing from the protection of the following claims.

I claim:
1. A rear view mirror having a reflective panel movable rapidly between two stable positions, the first position providing a bright image and the second position providing a dim image,
   (a) photoelectric circuit means mounted to receive light from the rear window of a vehicle in which the mirror is mounted and to produce an electrical signal in response to a predetermined intensity of such light,
   (b) driver means actuated by said photoelectric circuit means for moving said panel rapidly between said two positions in accordance with the presence or absence of a signal from said photoelectric means,
   (c) said driver means comprising a bimetallic actuator including an electric heater controlled by said electrical signal,
   (d) and detent means for holding said panel in either of its stable positions until a predetermined amount of force is applied to move the panel toward its other position.

2. The invention according to claim 1, said detent means including magnetic means for holding the panel in its stable positions until a sufficient amount of force is developed by the driver means to overcome the magnetic attraction of the magnetic detent means.

3. The invention according to claim 1, said detent means including a mechanical drive linkage having two over-center positions at which the panel is held in its resepective stable positions.

4. The invention according to claim 1, said driver means having a sufficiently slow time constant so that light flashes in the order of a fraction of a second in duration do not initiate movement of the panel from one of its stable positions to the other.

5. The invention according to claim 4, and manually adjustable means for changing the time constant of the driver means so as to change the duration period of the briefest light flash for which the panel will change positions.

References Cited by the Examiner
UNITED STATES PATENTS

| | | | |
|---|---|---|---|
| 2,669,159 | 2/1954 | Rogers | 88—77 |
| 2,758,499 | 8/1956 | Ulrich | 88—1 |
| 3,000,262 | 9/1961 | Rabinow et al. | 88—77 |

JEWELL H. PEDERSEN, *Primary Examiner.*

J. K. CORBIN, *Assistant Examiner.*